(12) United States Patent
Sussman et al.

(10) Patent No.: US 12,162,141 B2
(45) Date of Patent: Dec. 10, 2024

(54) ROBOT CHARGING DOCK WITH ILLUMINATED CHARGE CONNECTOR

(71) Applicant: Locus Robotics Corp., Wilmington, MA (US)

(72) Inventors: Michael Sussman, Winchester, MA (US); Seth Edwards Allen, Newton, NH (US); Brad Edward Fiore, Vernon, CT (US); Hian Kai Kwa, Reading, MA (US); Keegan Burgess Smith, Ipswich, MA (US); Rafael Gregorio Chavez, Boxborough, MA (US); Changchun Li, Concord, MA (US); Scott Matthew Rydbeck, Bedford, MA (US)

(73) Assignee: Locus Robotics Corp., Wilmington, MA (US)

( * ) Notice: Subject to any disclaimer, the term of this patent is extended or adjusted under 35 U.S.C. 154(b) by 477 days.

(21) Appl. No.: 17/532,203

(22) Filed: Nov. 22, 2021

(65) Prior Publication Data

US 2023/0150150 A1    May 18, 2023

Related U.S. Application Data

(63) Continuation-in-part of application No. 29/815,913, filed on Nov. 17, 2021, now Pat. No. Des. 1,024,944.

(51) Int. Cl.
*B25J 19/00* (2006.01)
*B25F 5/02* (2006.01)
(Continued)

(52) U.S. Cl.
CPC .......... *B25J 19/0066* (2013.01); *B25F 5/021* (2013.01); *B25J 13/087* (2013.01); *B25J 19/005* (2013.01);
(Continued)

(58) Field of Classification Search
CPC .... H02J 7/0042; B25J 19/005; B25J 19/0066; B25F 5/021; B60L 53/30; B60L 53/35; B60L 53/37
See application file for complete search history.

(56) References Cited

U.S. PATENT DOCUMENTS

| D420,323 S | 2/2000 | Nakamura |
| 6,389,329 B1 | 5/2002 | Colens |

(Continued)

FOREIGN PATENT DOCUMENTS

| EP | 1 921 523 A2 | 5/2008 |
| EP | 3 505 036 A1 | 7/2019 |

(Continued)

OTHER PUBLICATIONS

International Searching Authority/EP, International Search Report and Written Opinion of the International Searching Authority, Application No. PCT/US2022/050462, dated Feb. 23, 2023, 16 pages.

(Continued)

*Primary Examiner* — Evan P Dzierzynski
*Assistant Examiner* — Nathaniel J Lee
(74) *Attorney, Agent, or Firm* — Sunstein LLP

(57) ABSTRACT

Robot charging dock includes a charge connector configured to mate with a charging port of a mobile robot. There is a charge connector frame having a front surface on which the charge connector is mounted. The front surface has a first side edge and a second side edge. There is a front cover disposed over the charge connector frame which has an aperture through which the charge connector protrudes. At least a portion of the front cover is spaced from the front surface of the charge connector frame, defining an internal region. There is an opening to the internal region formed along at least a portion of a perimeter of the aperture and (Continued)

there is a light source disposed in the internal region. The light source is directed toward the opening to allow the light source to illuminate charge connector.

14 Claims, 4 Drawing Sheets

(51) Int. Cl.
*B25J 13/08* (2006.01)
*B60L 53/30* (2019.01)
*B60L 53/35* (2019.01)
*B60L 53/37* (2019.01)
*H02J 7/00* (2006.01)
*B25J 11/00* (2006.01)
*F21V 33/00* (2006.01)
*F21W 131/403* (2006.01)
*F21Y 115/10* (2016.01)

(52) U.S. Cl.
CPC ............... *B60L 53/30* (2019.02); *B60L 53/35* (2019.02); *B60L 53/37* (2019.02); *H02J 7/0042* (2013.01); *B25J 11/008* (2013.01); *F21V 33/00* (2013.01); *F21W 2131/403* (2013.01); *F21Y 2115/10* (2016.08)

(56) References Cited

U.S. PATENT DOCUMENTS

| | | | |
|---|---|---|---|
| 6,764,373 | B1 | 7/2004 | Osawa et al. |
| D573,089 | S | 7/2008 | Mandel et al. |
| 7,430,462 | B2 | 9/2008 | Chiu et al. |
| 7,501,780 | B2* | 3/2009 | Yamamoto ........... G05D 1/0234 700/250 |
| 7,729,801 | B2 | 6/2010 | Abramson |
| D621,345 | S | 8/2010 | Tinius |
| D668,218 | S | 10/2012 | Dai et al. |
| 8,352,114 | B2 | 1/2013 | More et al. |
| 8,452,450 | B2 | 5/2013 | Dooley et al. |
| 8,476,867 | B2 | 7/2013 | Li et al. |
| D691,553 | S | 10/2013 | Deoksang et al. |
| D695,215 | S | 12/2013 | Neidhart et al. |
| D698,310 | S | 1/2014 | Yun et al. |
| D712,827 | S | 9/2014 | Maeda et al. |
| 8,854,001 | B2 | 10/2014 | Cohen et al. |
| D719,911 | S | 12/2014 | Lathrop et al. |
| D721,650 | S | 1/2015 | Fauchet et al. |
| D762,172 | S | 7/2016 | Pignotti |
| 9,463,927 | B1 | 10/2016 | Theobald |
| D782,412 | S | 3/2017 | Kim et al. |
| D835,579 | S | 12/2018 | Jones et al. |
| 10,698,411 | B1* | 6/2020 | Ebrahimi Afrouzi ........................ G05D 1/0225 |
| 2010/0296908 | A1 | 11/2010 | Ko |
| 2011/0200420 | A1 | 8/2011 | Driskill et al. |
| 2012/0330458 | A1 | 12/2012 | Weiss |
| 2013/0134937 | A1 | 5/2013 | Umeda et al. |
| 2013/0317642 | A1 | 11/2013 | Asaria et al. |
| 2017/0072564 | A1 | 3/2017 | Cohen et al. |
| 2017/0271895 | A1* | 9/2017 | Chen ..................... H02J 7/0042 |
| 2018/0014709 | A1 | 1/2018 | O'Brien et al. |
| 2018/0334052 | A1 | 11/2018 | Hwang et al. |
| 2019/0092183 | A1 | 3/2019 | Sussman et al. |
| 2019/0155295 | A1* | 5/2019 | Moore ................. G05D 1/0225 |
| 2021/0228039 | A1* | 7/2021 | Brouwers ........... A47L 11/4005 |
| 2021/0288455 | A1 | 9/2021 | Stack et al. |

FOREIGN PATENT DOCUMENTS

| | | |
|---|---|---|
| EP | 3 858 208 A2 | 8/2021 |
| JP | 2006-231448 | 9/2006 |
| JP | 2010-165596 | 7/2010 |

OTHER PUBLICATIONS https://www.thenewwarehouse.com/wp-content/uploads/2019/12/Charging-Stations-scaled.jpg.

* cited by examiner

ROBOT CHARGING DOCK WITH ILLUMINATED CHARGE CONNECTOR

CROSS REFERENCE TO RELATED APPLICATION

This application is a continuation-in-part of U.S. Design Pat. application No. 29/815,913, filed Nov. 17, 2021, which is incorporated herein by reference in its entirety.

TECHNICAL FIELD

The present invention relates to robot charging dock having a charge connector configured to mate with a charge port on a robot and more particularly to such a charge connector which is illuminated.

BACKGROUND ART

Autonomous mobile robots (AMRs) may be configured to automatically dock with a dedicated charging dock in order to keep the vehicle batteries charged and thus provide continuous operation without manual intervention. AMRs typically use multiple sensors to locate the charging dock and accurately mate a charge port on the robot with a charge connector on the charging dock to provide a path for electrical current to flow into and charge the robot's batteries.

The primary navigation sensor for a typical AMR is a laser range finding device (Lidar). However, Lidar device accuracy may not always be sufficient to accurately dock at a charging station. For this reason, a vision system (e.g. camera and computer software) is typically used as a secondary sensor to accurately locate and mate with the dock's charge connector.

In many cases, robots used in facilities are required to maintain a high state of charge overnight to offer full availability for first-shift operations. Facility lighting is often dimmed or dark during the overnight period. Thus, accurate docking of the AMR charging port to the charge connector of the charging station in low or no light using the vision camera can present serious challenges. As a result, there is a need to overcome the challenges of accurate docking with an AMR in low or no warehouse lighting.

SUMMARY OF THE EMBODIMENTS

In accordance with one embodiment of the disclosure, a robot charging dock is provided. The charging dock includes a charge connector configured to mate with a charging port of a mobile robot and a charge connector frame having a front surface on which the charge connector is mounted. The front surface has a first side edge and a second side edge and there is a front cover disposed over the charge connector frame and having an aperture through which the charge connector protrudes. There is at least a portion of the front cover spaced from the front surface of the charge connector frame, defining an internal region. There is an opening to the internal region formed along at least a portion of a perimeter of the aperture and a light source disposed in the internal region. The light source is directed toward the opening to allow the light source to illuminate charge connector.

In one or more embodiments the following features may be included. The light source may be positioned proximate one of the first side edge or the second side edge of the front surface of the charge connector frame. The light source may comprises a first light source positioned proximate the first side edge and a second light source positioned proximate the second side edge. The light source may comprises a plurality of LEDs positioned along a portion of one of the first side edge or the second side edge of the front surface of the charge connector frame and the plurality of light emitting diodes may be directed toward the opening to illuminate the charge connector. The first light source may comprises a first plurality of LEDs positioned along a portion of the first side edge of the front surface of the charge connector frame and the second light source may comprise a second plurality of LEDs positioned along a portion of the second side edge of the front surface of the charge connector frame. The first plurality of LEDs may be directed toward a first opening formed along a first portion of the perimeter of the aperture and the second plurality of LEDs may be directed toward a second opening formed along a second portion of the perimeter of the aperture. The light source may comprise a light pipe having an input side positioned proximate and facing the plurality of LEDs and an output side facing the charge connector. The first light source may comprise a first light pipe having an input side positioned proximate and facing the first plurality of LEDs and an output side facing the charge connector and wherein the second light source comprises a second light pipe having an input side positioned proximate and facing the second plurality of LEDs and an output side facing the charge connector.

In one or more embodiments the following additional features may be included. The plurality of LEDs may be disposed along an edge of a printed circuit board; and the printed circuit board may be mounted on a side surface of the charge connector frame with the plurality LEDs extending beyond one of the first side edge and the second side edge of the front surface. The light pipe may be mounted on the front surface of the charge connector frame with the input side extending along a portion of one of the first side edge and the second side edge of the front surface to align with the plurality of LEDs extending beyond one of the first side edge and the second side edge of the front surface. The first plurality of LEDs may be disposed along an edge of a first printed circuit board, wherein the first printed circuit board is mounted on a first side surface of the charge connector frame with the first plurality LEDs extending beyond the first side edge of the front surface. The second plurality of LEDs may be disposed along an edge of a second printed circuit board, and the second printed circuit board may be mounted on a second side surface of the charge connector frame with the second plurality LEDs extending beyond the second side edge of the front surface. The first light pipe may be mounted on the front surface of the charge connector frame with the input side extending along a portion of the first side edge to align with the first plurality of LEDs extending beyond the first side edge of the front surface. The second light pipe may be mounted on the front surface of the charge connector frame with the input side extending along a portion of the second side edge to align with the second plurality of LEDs extending beyond the second side edge of the front surface. The light pipe may be rectangular in shape and it may have a first side edge which extends along a portion of one of the first side edge and the second side edge of the front surface to align with the plurality of LEDs extending beyond one of the first side edge and the second side edge of the front surface. The light pipe may have a second side edge which is aligned with the opening to the internal region. The first light pipe may be rectangular in shape and a first side edge may extend along a portion of the first side edge of the front surface to align with the first plurality of LEDs extending beyond the first side edge of the front surface. The first light pipe may have a second side edge which is aligned with the first opening to the internal region and the second light pipe may be rectangular in shape and have a first side edge which extends along a portion of the second side edge of the front surface to align with the second plurality of LEDs extending beyond the second side edge of the front surface. The second light pipe may have a second side edge which is aligned with the second opening to the internal region.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
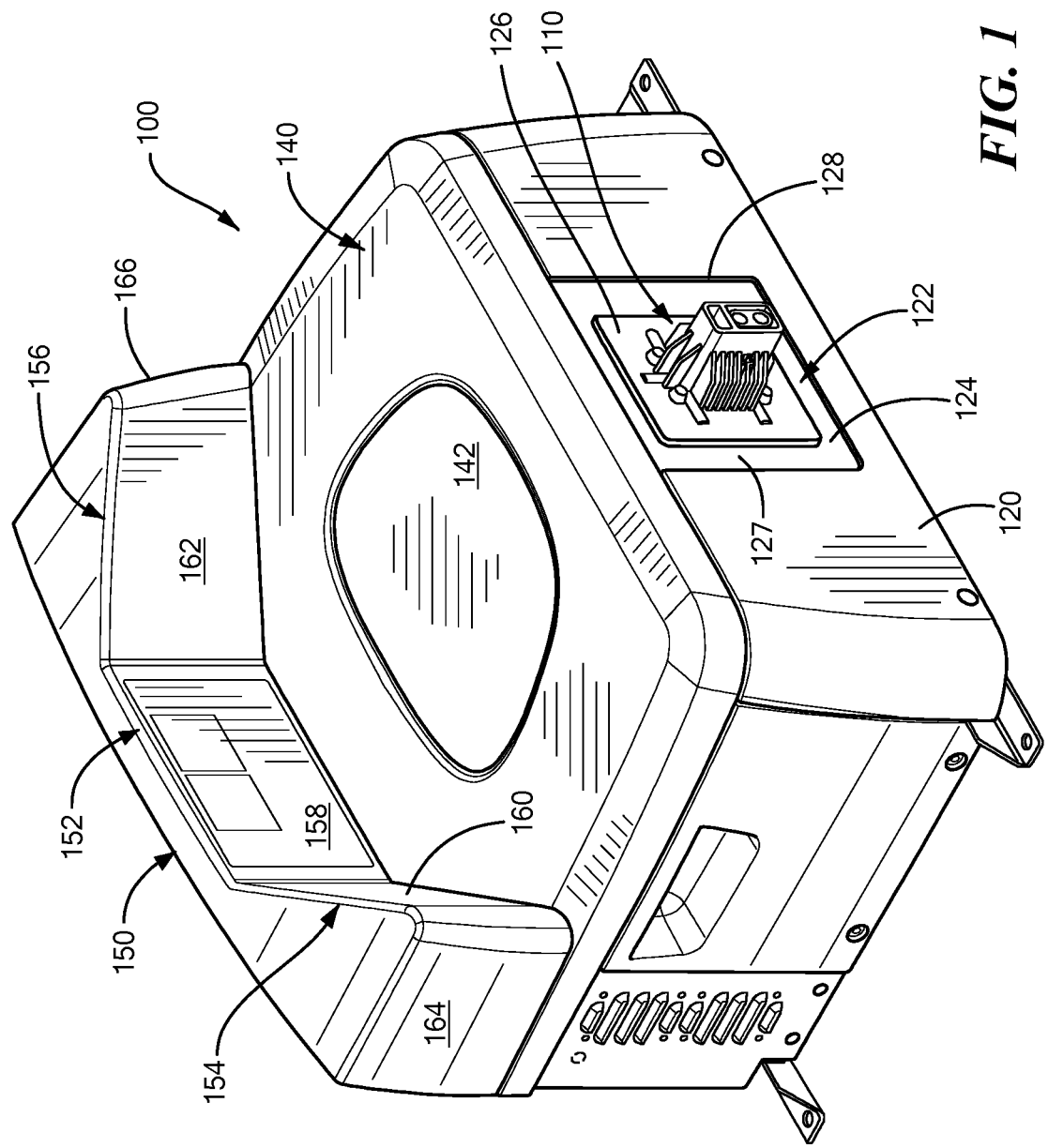
FIG. 1 is a front and side perspective view of the robot charging dock according an embodiment of this disclosure.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments, as the skilled artisan would recognize, even if not explicitly stated herein.

Descriptions of well-known components and processing techniques may be omitted to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The invention is directed to an electrical charging system for use in charging autonomous mobile robots (AMRs). Although not restricted to any particular AMR application, one suitable application that the charging dock may be used in is warehouse order fulfillment. The use of robots in this application will be described to provide context for the electrical charging system; however, the electrical charging system described herein is not limited to this application and it may be used in various applications of AMRs.

Referring to FIG. 1, a robot charging dock 100, according to an aspect of this disclosure, is depicted. Charging dock 100 includes a charge connector 110 configured to mate with a charging port of an AMR (not shown) to enable the AMR to recharge when needed. It should be noted that functional and design aspects of charging dock 100 and charge connector 110 are merely exemplary and should not be considered limiting.

In many applications, including warehouse order fulfillment, AMRs are required to maintain a high state of charge overnight to offer full availability to first-shift operations. AMRs must autonomously navigate to and mate with the charging dock. The primary navigation sensor for a typical AMR is a laser range finding device (Lidar). However, Lidar device accuracy may not always be sufficient to properly dock at a charging dock. For this reason, a vision system (e.g. camera and computer software) is typically used as a secondary sensor to accurately locate and mate with the dock's charge connector. In warehouse order fulfillment, and other applications, lighting is often dimmed or dark during the overnight period. Thus, accurate docking of the AMR charging port to the charge connector of the charging station in low or no light using the vision camera can present a serious challenges.

In order to counter this, it was determined that lighting of the charge connector would be desirable to provide adequate contrast to the robot vision system when docking with the charging dock. However, the contrast-enhancing lighting must be reliable over the service life of the charging dock, it must not interfere with mating, and it must be unobtrusive under normal ambient lighting conditions. This disclosure provides an approach to lighting the charge connector which achieves the foregoing objectives.

Continuing to refer to FIG. 1, robot charging dock 100 includes an external cover, which may be made of a hard plastic, opaque material, which may comprise several cover components, including front cover 120. Front cover 120 has an aperture 122 formed therein through which charge connector 110 protrudes. The aperture 122 exposes a portion of front surface 124 of charge connector frame 130 (shown in FIG. 2). The charge connector 110 includes a base plate 126, which is mounted onto front surface 124. Between the front cover 120 and the front surface 124 of charge connector frame 130 there is an opening or gap extending along edges 127 and 128 of front cover 120 about the sides of aperture 122, which allows light from a light source to emanate from an internal region and illuminate the portion of the front surface 124 visible in aperture 122 as well as the charge connector 110. This will be described in more detail below.

Before describing the light source in the internal region, which is defined by the spacing between the inside surface of front cover 120 and the front surface 124 of charge connector frame 130, certain other aspects of the exterior of charging dock 100 are described for completeness. Top cover 140 may include a user interface panel 142 disposed in a cavity in the surface of top cover 140. The user interface panel may include certain indicators and controls for a user to operate the Charging dock 100. For example, lighting signals to indicate various states such as "Ready", "Charging", "Power On", "Recovery Mode", and "Fault" may be included. A button to start a manual charge may also be included.

Along the back edge of top cover 140 is a back panel 150, which comprises a center panel section 152 and side panel sections 154 and 156 on the left right sides, respectively, of center panel section 152. Center panel section 152 has a rectangular front surface 158 which is substantially parallel to front cover 120. Left side panel section 154 has a rectangular front surface 160 and right side panel section 156 has a rectangular front surface 162.

Right and left side panels 154 and 156 sections have wide sidewalls 164 and 166, respectively, on one side and converge to narrower widths on the other sides which interconnect with center panel section 152. Thus, right and left side panel sections 154 and 156 are wedge-shaped. As a result, their front surfaces 160 and 162 are not parallel with front surface 158 of center panel 152 or front cover 120. They are each disposed at an angle, θ, with respect to surface 158. Fiducial markers (e.g. a 2-dimensional bar code) may be disposed on front surfaces 160 and 162, respectively, and, as is known in the art, AMRs may use the angled fiducial markers for precision navigation during the process of docking with the charging dock The angled surfaces are used in conjunction with the Lidar to accurately locate the dock. The 2-D barcodes may be read by the cameras and used to identify the dock number in order to maintain robot order of charging/queuing at docks. The cameras may also be used for navigation by capturing the image of the rectangular outline of 126 charge connector.

Figure 2:
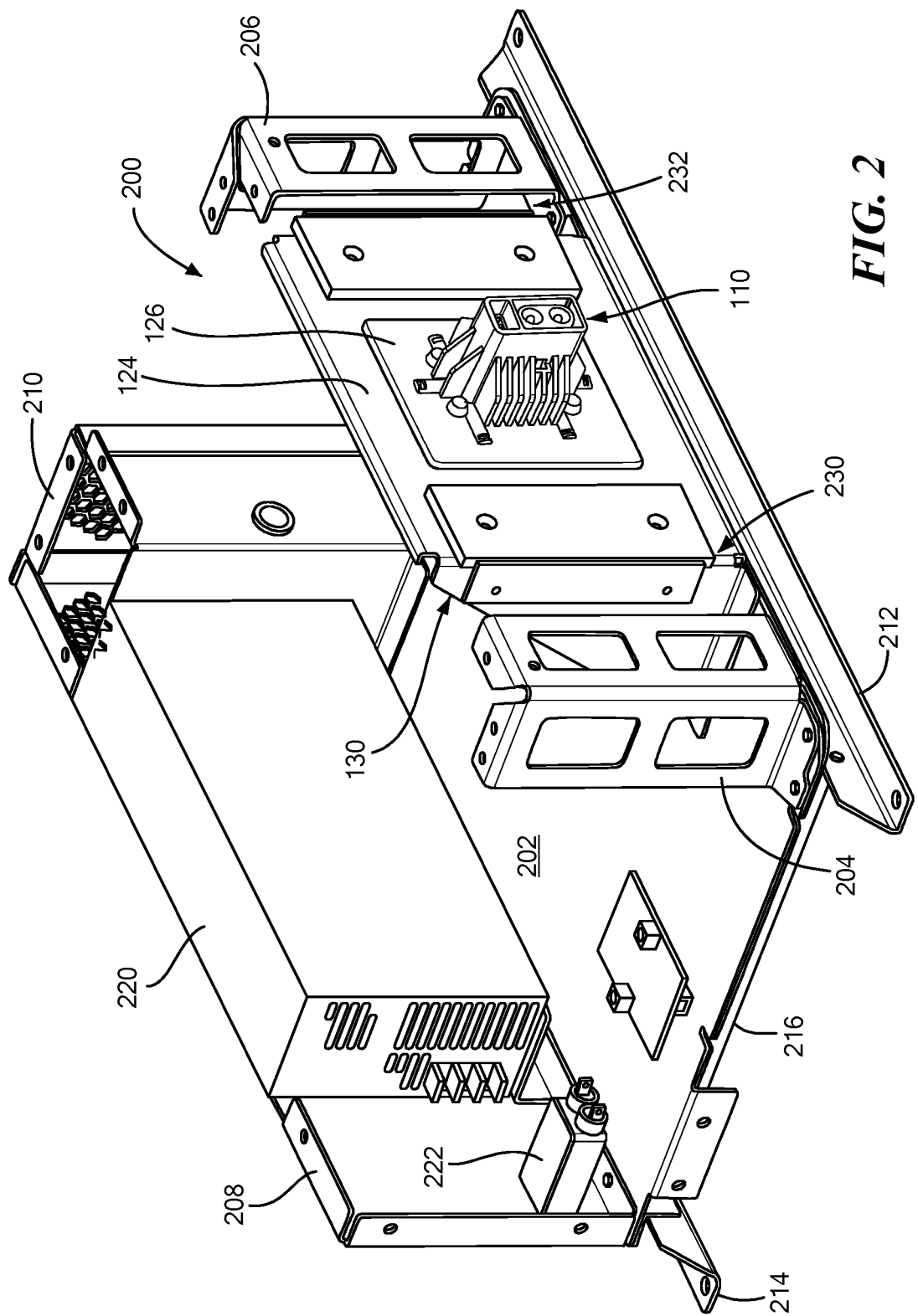
FIG. 2 is a front and side perspective view of a portion of the frame of the robot charging dock of FIG. 1 with the external cover removed.

Referring to FIG. 2 there is shown a portion of metal frame 200 for robot charging dock 100 of FIG. 1. Metal frame 200 comprises charge connector frame 130, which is connected to frame floor 202 at the front side of frame 200. Front corner supports 204 and 206 are connected to frame floor 202 at each front corner of frame 200 and on either side of charge connector frame 130. A rear frame element 208 spans the length of and is connected to the frame floor 202 along the back of the metal frame 200. One rear corner support 210 is shown, but the other is omitted from this figure for clarity. There are front and rear floor mounts 212 and 214, respectively, which are affixed to frame base 216. Mounts 212 and 214 may be secured to the floor of the warehouse.

In addition to the charge connector 110, the only other components shown in FIG. 2 are power supply 220, power outlet 222, first light source 230 to the left of charge connector 110 and base plate 126, and second light source 232 to the right of charge connector 110 and base plate 126. Light sources 230 and 232 are used to illuminate charge connector 110, base plate 126, and the portion of front surface 124 of charge connector frame 130 which is visible through aperture 122. This illumination improves the ability of the AMR's vision camera to detect and mate with charge connector 110, especially during low or no light conditions within a facility. To further improve the illumination, front surface 124 may be painted with a light colored paint, e.g. white.

Figure 3:
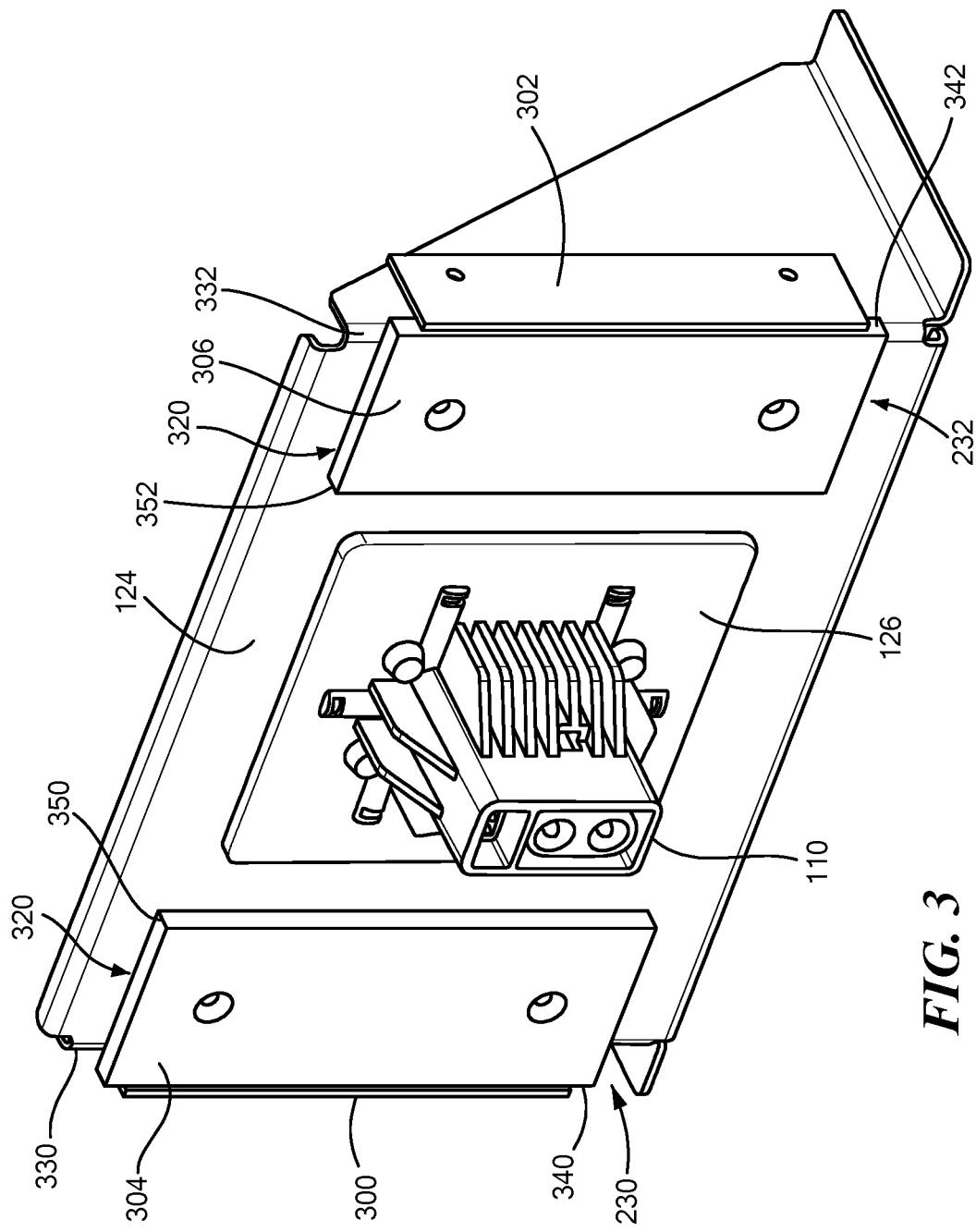
FIG. 3 is an enlarged front perspective view of the charge connector frame shown in FIG. 2.

Referring to FIG. 3, first light source 230 is shown to include a printed circuit board (PCB) 300, including a first plurality of LEDs (not shown in this figure) and second light source 232 is shown to include PCB 302 which includes a second plurality of LEDs (also not shown in this figure). First light source 230 also includes a light pipe 304 and second light source 232 includes a light pipe 306. Both light pipes 304 and 306 are shown mounted on front surface 124 charge connector frame 130. It should be noted that only a single light source need be used and that the one or more light sources may be disposed at various locations on/near surface 124 about the charge connector 110. The embodiment with two light sources disposed on either side of the charge connector 110 is only an exemplary embodiment.

While the light pipes 304 and 306 may be of various shapes and sizes and mounted in a range of locations, they are exemplarily depicted as flat, rectangular, plastic light pipes mounted on either side of the charge connector 110 on front surface 124. Each light pipe is lit on-edge using a PCB-mounted linear array of LED lamps. The light pipes and LEDs are arranged to fit under the front cover 120, in an internal region 320, defined between the front surface 124 of charge connector frame 130 and the interior surface of front cover 120 (not shown in this view). The light pipes provide for even illumination and accommodate mounting of the LEDs away from the charge connector 110 where convenient physical mounting space can be provided. Alternate embodiments of the light pipes allow the LED PCBAs to be placed behind bracket 330 instead at the sides. For example, the light pipes can be formed with a 90 degree bend, or could be cut at a 45 degree angle such that internal reflection directs incoming light at a 90 degree angle.

The first plurality of LEDs on PCB 300 are positioned along a portion of the first side edge 330, FIG. 3, of the front surface 124 and the second plurality of LEDs on PCB 302 are positioned along a portion of the second side edge 332 of the front surface 124. The first plurality of LEDs are aligned with and facing a first side edge (or input) 340 of light pipe 304 and the second plurality of LEDs are aligned with and facing a first side edge (or input) 342 of light pipe 306. In this embodiment, the LEDs are positioned along an edge of PCBs 302 and 304, which PCB edges extend beyond the front surface 124 in the regions of front surface edges 330 and 332.

Figure 4:
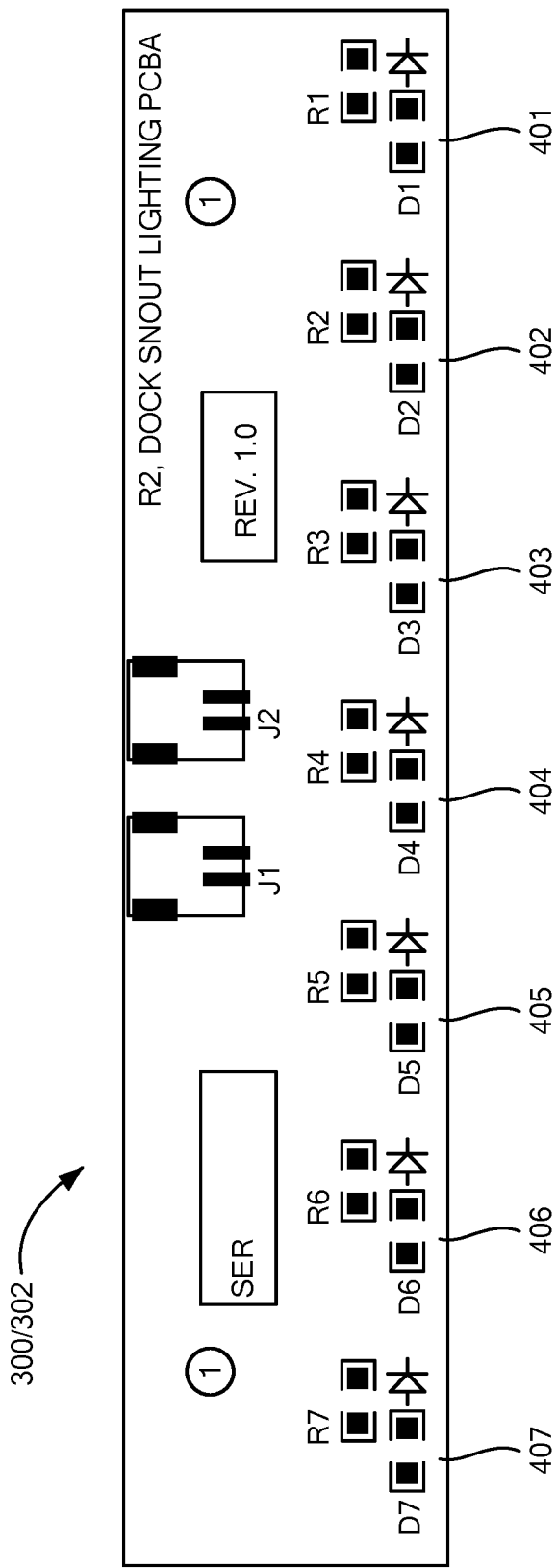
FIG. 4 is a top plan view of the printed circuit board shown in FIGS. 2 and 3, depicting the plurality of light emitting diodes thereon.

In this way, the LEDs are directly facing the input sides 340 and 342 of light pipes 304 and 306, respectively. It should be noted that the LEDs may be mounted/configured differently than depicted, as long as they are in internal region 320 and are directed to input light into the light pipes. There is shown in FIG. 4, a PCB such as PCBs 300/302. These PCBs include a plurality of LEDs, i.e. 401-407, disposed along an edge of the PCB. Different PCB configurations may be used having more or less LEDs and different configurations other than being disposed linearly along an edge. The LEDs may be controlled to turn on during low/no lighting conditions and turn off when there is sufficient light in the facility. Alternatively, the LEDs may remain on continuously to provide better contrast for robot vision systems in all lighting conditions.

With this embodiment, the first light pipe 304 has a second or output edge 350 facing a first side of charge connector 110 and the second light pipe 306 has a second or output edge 352 facing a second side of charge connector 110. Therefore, the light from the first plurality of LEDs entering the first side edge (or input) 340 of light pipe 304 exits the second or output edge 350 and illuminates the first side of charge connector 110. Therefore, the light from the second plurality of LEDs entering the first side edge (or input) 342 of light pipe 306 exits the second or output edge 352 and illuminates the second side of charge connector 110

While not required, the second/output edges 350 and 352 of light pipes 304 and 306, respectively, may be aligned with complimentary edges of front cover 120, FIG. 1. In other words, the second side edge 350 of first light pipe 304 may be aligned with the edge 127 of front cover 120 and the second side edge 352 of second light pipe 306 may be aligned with the edge 128 of front cover 120. As noted above, there is a gap or opening between front cover 120 and front surface 124 of charge connector frame 130 about portions of the aperture. For example, such a gap/opening would be present along edges 127 and 128 of front cover 120 to allow light from the light sources to pass and illuminate charge connector 110. The light source(s) and the gap(s)/opening(s) may be located in different positions.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. Robot charging dock, comprising:
   a charge connector configured to mate with a charging port of a mobile robot;
   a charge connector frame having a front surface on which the charge connector is mounted; the front surface having a first side edge and a second side edge;
   a front cover disposed over the charge connector frame and having an aperture through which the charge connector protrudes; at least a portion of the front cover is spaced from the front surface of the charge connector frame, defining an internal region;
   an opening to the internal region formed along at least a portion of a perimeter of the aperture; and
   a light source disposed in the internal region; the light source being directed toward the opening to allow the light source to illuminate charge connector.

2. The robot charging station of claim 1 wherein the light source is positioned proximate one of the first side edge or the second side edge of the front surface of the charge connector frame.

3. The robot charging station of claim 2 wherein the light source comprises a plurality of LEDs positioned along a portion of one of the first side edge or the second side edge of the front surface of the charge connector frame; wherein the plurality of light emitting diodes are directed toward the opening to illuminate the charge connector.

4. The robot charging station of claim 3 wherein the— light source comprises a light pipe having an input side positioned proximate and facing the plurality of LEDs and an output side facing the charge connector.

5. The robot charging station of claim 4 wherein the plurality of LEDs are disposed along an edge of a printed circuit board; wherein the printed circuit board is mounted on a side surface of the charge connector frame with the plurality LEDs extending beyond one of the first side edge and the second side edge of the front surface.

6. The robot charging station of claim 5 wherein the light pipe is mounted on the front surface of the charge connector frame with the input side extending along a portion of one of the first side edge and the second side edge of the front surface to align with the plurality of LEDs extending beyond one of the first side edge and the second side edge of the front surface.

7. The robot charging station of claim 6 wherein the light pipe is rectangular in shape and has a first side edge which extends along a portion of one of the first side edge and the second side edge of the front surface to align with the plurality of LEDs extending beyond one of the first side edge and the second side edge of the front surface; wherein the light pipe has a second side edge which is aligned with the opening to the internal region.

8. The robot charging station of claim 1 wherein the light source comprises a first light source positioned proximate the first side edge and a second light source positioned proximate the second side edge.

9. The robot charging station of claim 8 wherein the first light source comprises a first plurality of LEDs positioned along a portion of the first side edge of the front surface of the charge connector frame and the second light source comprises a second plurality of LEDs positioned along a portion of the second side edge of the front surface of the charge connector frame; wherein the first plurality of LEDs are directed toward a first opening formed along a first portion of the perimeter of the aperture and the second plurality of LEDs are directed toward a second opening formed along a second portion of the perimeter of the aperture.

10. Robot charging dock, comprising:
    a charge connector configured to mate with a charging port of a mobile robot;
    a charge connector frame having a front surface on which the charge connector is mounted; the front surface having a first side edge and a second side edge;
    a front cover disposed over the charge connector frame and having an aperture through which the charge connector protrudes; at least a portion of the front cover is spaced from the front surface of the charge connector frame, defining an internal region;
    an opening to the internal region formed along at least a portion of a perimeter of the aperture; and
    a light source disposed in the internal region; the light source being directed toward the opening to allow the light source to illuminate charge connector;
    wherein the light source comprises a plurality of LEDs positioned along a portion of one of the first side edge or the second side edge of the front surface of the charge connector frame; wherein the plurality of light emitting diodes are directed toward the opening to illuminate the charge connector; and
    wherein the—light source comprises a light pipe having an input side positioned proximate and facing the plurality of LEDs and an output side facing the charge connector.

11. The robot charging station of claim 10 wherein the the light source comprises a first light source comprising a first plurality of LEDs positioned proximate the first side edge of the front surface of the charge connector frame and a second light source comprising a second plurality of LEDs positioned proximate the second side edge of the front surface of the charge connector frame, and wherein the light pipe comprises a first light pipe and a second light pipe, the first light pipe having an input side positioned proximate and facing the first plurality of LEDs and the second light pipe having an input side positioned proximate and facing the second plurality of LEDs, and each of the first light pipe and the second light pipe having an output side facing the charge connector.

12. The robot charging station of claim 11 wherein the first plurality of LEDs are disposed along an edge of a first printed circuit board, wherein the first printed circuit board is mounted on a first side surface of the charge connector frame with the first plurality LEDs extending beyond the first side edge of the front surface; and wherein the second plurality of LEDs are disposed along an edge of a second printed circuit board, wherein the second printed circuit board is mounted on a second side surface of the charge connector frame with the second plurality LEDs extending beyond the second side edge of the front surface.

13. The robot charging station of claim 12 wherein the first light pipe is mounted on the front surface of the charge connector frame with the input side extending along a portion of the first side edge to align with the first plurality of LEDs extending beyond the first side edge of the front surface; and wherein the second light pipe is mounted on the front surface of the charge connector frame with the input side extending along a portion of the second side edge to align with the second plurality of LEDs extending beyond the second side edge of the front surface.

14. The robot charging station of claim 13 wherein the first light pipe is rectangular in shape and a first side edge which extends along a portion of the first side edge of the front surface to align with the first plurality of LEDs extending beyond the first side edge of the front surface; wherein the first light pipe has a second side edge which is aligned with the first opening to the internal region; and wherein the second light pipe is rectangular in shape and a first side edge which extends along a portion of the second side edge of the front surface to align with the second plurality of LEDs extending beyond the second side edge of the front surface; and wherein the second light pipe has a second side edge which is aligned with the second opening to the internal region.

\* \* \* \* \*